United States Patent [19]

Schrader

[11] Patent Number: 4,655,123
[45] Date of Patent: Apr. 7, 1987

[54] COFFEE MAKER IMPROVEMENT FOR MEASURED CHARGES FROM BOTTLED WATER

[75] Inventor: W. Charles Schrader, North Hills, Pa.

[73] Assignee: Tru-Brew, Hatboro, Pa.

[21] Appl. No.: 792,052

[22] Filed: Oct. 28, 1985

[51] Int. Cl.⁴ .............................................. A47J 31/00
[52] U.S. Cl. ........................................ 99/279; 99/300; 99/307; 141/250; 222/639; 222/640; 222/383
[58] Field of Search ......................... 99/300, 307, 279; 222/639, 640, 383; 141/250–284, 94, 95, 96

[56] References Cited

U.S. PATENT DOCUMENTS

| | | | |
|---|---|---|---|
| 3,568,887 | 3/1971 | Jacobs et al. | 222/640 |
| 3,900,136 | 8/1975 | Paranto | 222/639 |
| 4,015,749 | 4/1977 | Arzberger et al. | 222/640 |

Primary Examiner—Houston S. Bell, Jr.
Attorney, Agent, or Firm—Ferrill and Logan

[57] ABSTRACT

A system is disclosed for transferring a predetermined charge of water between a bottled water container and a coffee maker. The system comprises a pump and a timer which operates the pump for a preset period of time while a charge of water is transferred through a series of conduits from a bottled water container to a coffee maker, the quantity of the charge being substantially independent of bottled water level.

9 Claims, 2 Drawing Figures

COFFEE MAKER IMPROVEMENT FOR MEASURED CHARGES FROM BOTTLED WATER

BACKGROUND OF THE INVENTION

This invention relates to apparatus for charging coffee makers with bottled water.

Commercial type automatic drip coffee makers are usually adapted to be charged with cold water through a direct attachment to plumbing from municipal water supplies. This permits rapid and easy filling of the coffee maker with the amount of water needed. Traditionally, the flow of water from the plumbing is controlled by a timer, built into the coffee maker, which operates an electromagnetically actuated solenoid valve. Taking into account the rate of flow of the water from the given plumbing, the timer is set to open and close the solenoid valve so to fill the coffee maker with the necessary amount of water.

This apparatus suffers from the limitations inherent in the quality of water supplied from the existing water supplies. The automatic coffee makers presently available can fill automatically only using the water available through the building's plumbing. Since the quality of coffee is directly dependent on the quality of the water used to make it, this impairs the use of automatic coffee makers in areas with water supplies containing distasteful contaminents.

Until now some automatic coffee makers could be charged with bottled water only using manual techniques of transferring the water from the bottled water dispenser to the coffee maker. This has proven to be burdensome and time consuming. Moreover, other designs of automatic coffee makers make manual filling impossible.

An object of the present invention is to provide a means for automatically transferring bottled water to coffee makers, thus benefiting from the improved quality of bottled water while greatly reducing the burden of manually transferring water from a water bottle to a coffee maker.

An additional object of the present invention is to provide apparatus for transferring bottled water to existing coffee makers which is straightforward in design and inexpensive to produce.

SUMMARY OF THE INVENTION

In the present invention there is provided a pump unit designed to transfer a predetermined amount of water between a bottled water container and a coffee maker. The invention is specifically designed to service high volume commercial type automatic drip coffee makers which have traditionally received their water from direct attachments to municipal water supplies.

The pump unit comprises a water pump having an intake and an output orifice, an intake pipe connecting the intake orifice of the pump with the contents of the water container, a fill line connecting the output orifice of the pump with the coffee maker, a valve on the intake pipe which keeps the pump primed, and a timer which is preset to operate the pump for precisely enough time to fill the coffee maker.

The present invention can be readily adapted to operate with existing commercial type automatic drip coffee makers and can even use timers and valves already existing on many such machines.

The present invention avoids tedious manual filling of coffee makers with bottled water, but provides the benefits of high quality water which produces superior coffee.

DETAILED DESCRIPTION OF THE INVENTION

Figure 1:
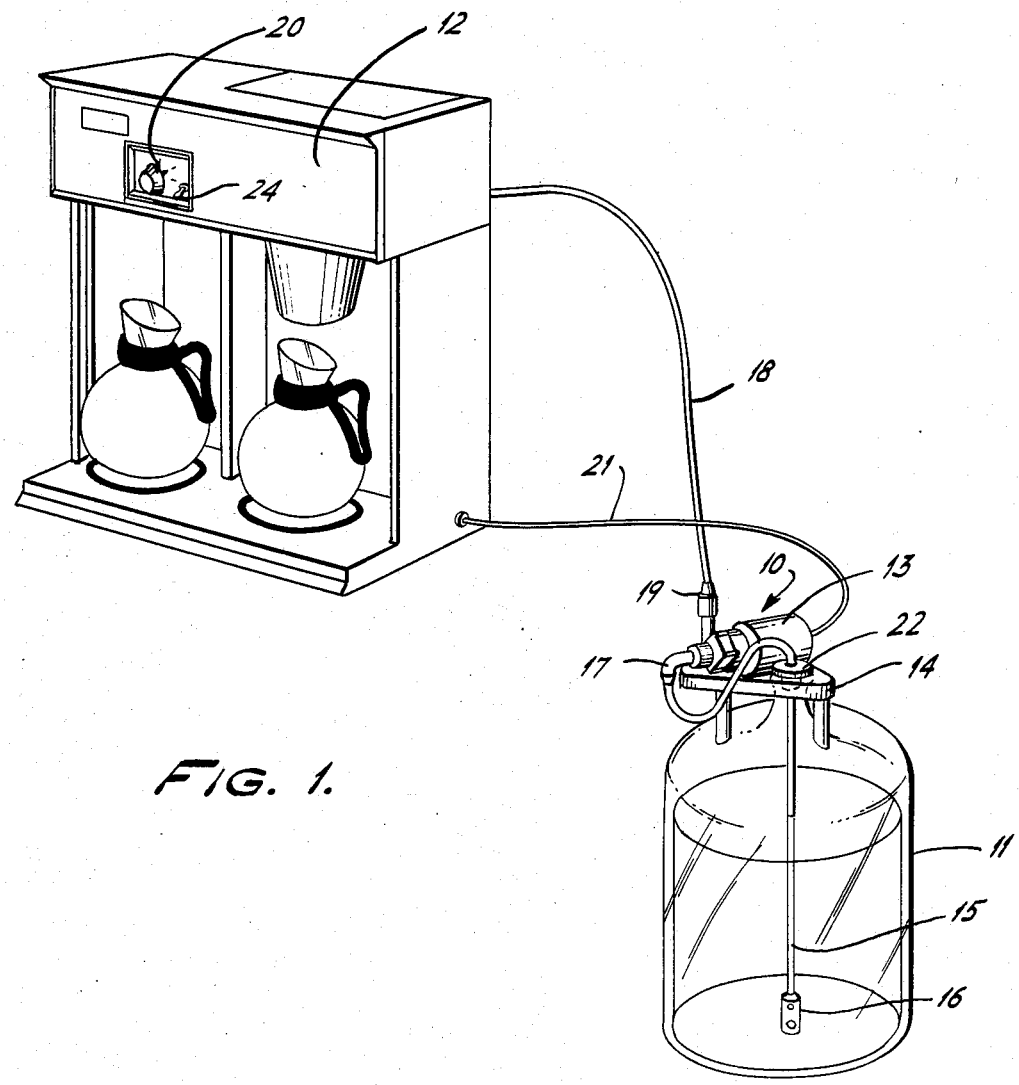
FIG. 1 is a perspective view of the present invention operating with a conventional automatic drip coffee maker.

An apparatus for charging coffee makers with bottled water is provided. Referring to the drawings, there is illustrated in FIG. 1 a pump unit 10 attached to a standard plastic five gallon bottled water container 11 and a standard commercial-type automatic drip coffee maker 12.

The pump unit 10 comprises: a water pump 13 mounted on a tripod stand 14; an intake pipe 15, one end of which is capped with a check valve 16 and submerged into the filled water container 11 and the other end of which is attached to the intake orifice 17 of the pump 13; a fill line 18 running from the output orifice 19 of the pump 13 to the reservoir of the coffee maker 12; and a timer 20 which controls the electrical current feeding the pump 13 through an electrical cord 21.

The pump 13 may be of any type capable of transporting liquids without contamination, such as small pumps used in decorative fountains and waterfalls. A pump having a small (e.g. 115 volt, 1/20 horsepower) electric motor, such as a model 3-MD pump produced by Little Giant Pump Company, has proven to be completely adequate. The pump 13 should be approved by the National Sanitation Foundation (N.S.F.) for use in transporting liquids used for human consumption. Although it is not necessary, initial installation of the unit 10 would be more easily accomplished if the pump 13 is "self-priming."

The tripod stand 14 serves to hold the pump 13, the intake pipe 15, and the water container 11 in proper alignment with respect to each other. Moreover, the stand 14 contains a cap 22 which covers the water container 11 from contamination and helps reduce water loss due to evaporation. It has been found that the stand also works satisfactorily when a sleeve, which is aligned under the cap 22 and fits snugly into the neck of the water container 11, is substituted for tripod legs.

The intake pipe 15 may be constructed of any suitable material designed for transporting consumable liquids, such as ⅜-inch copper tubing. The intake pipe 15 extends to the bottom of the water container 11.

The check valve 16 at the end of the intake pipe 15 is provided to keep the pump 13 primed between successive uses. The pump 13 must be kept primed at all times, even if a self-priming pump is used in order to assure that the correct amount of water passes through the pump and into the coffee makers during the allotted time. A ball check valve is preferred for this purpose because it is simple and inexpensive.

The fill line 18 should be constructed of a flexible material, such as ¼ inch plastic tubing, which permits unit 10 to be readily moved to replace water container 11 or to adjust the location or position of the pump unit 10 and water container 11 subassembly. When the pump unit 10 is used with commercial-type automatic coffee makers 12 which are adapted to attach directly to cold water plumbing, such as a Model J-71 automatic drip coffee maker produced by Therm Industries, Inc., the fill line 18 should be attached directly to the plumbing inlet to the reservoir or "interior" of the coffee maker. With non-automatic coffee makers, the fill line 18 may be positioned in the opening through which to manually fill the reservoir of the coffee maker.

Commercial-type automatic drip coffee makers 12 which are adapted to attach directly to municipal water supplies have traditionally used an electrical or mechanical timer 20 which electrically operates an electromagnetically activated solenoid valve. When using these coffee makers, the fill time, which is a function of the rate of flow from the municipal water supply, is first determined and the built-in timer is set accordingly. The activation of the timer 20 opens the solenoid valve, which permits the coffee maker to fill with water; at the predetermined time, the solenoid valve will close.

The solenoid valve controlling timers 20 provided with commercial type automatic coffee makers 12 can be easily adapted to control the pump 13 used in the present invention. In addition to operating the solenoid valve, the output of the timer 20 can be directed to operating the switching of the electrical current to the pump 13.

Figure 2:
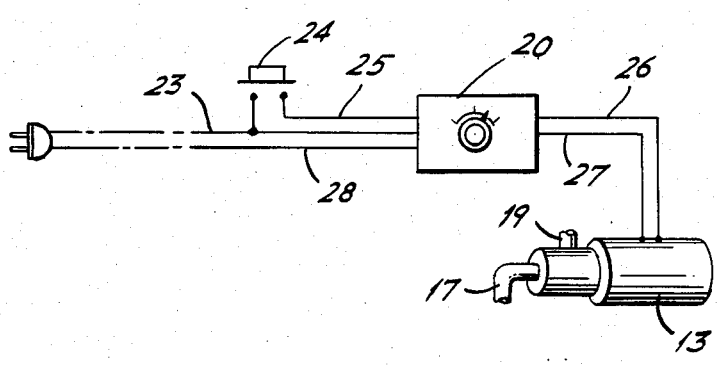
FIG. 2 is a schematic representation of the switching and timing elements of one embodiment of the present invention.

As seen in FIG. 2, the timer 20 receives electric current via line 23. The activation of a switch 24 provides an electrical impulse via line 25 which initiates the timer 20. The timer 20 then activates a switch to allow electrical current to enter the pump 13 via line 26. The electric current carried via ground lines 27 and 28 completes the circuit.

When the present invention is employed with coffee makers not having a built-in timer, any relatively accurate appliance-type timer capable of being push-button reset and conducting and switching electric current may be used.

To use the present invention, the unit 10 is installed in a filled water container 11. The pump 13 should be primed. The timer should be preset to the amount of time needed to fill the reservoir of the coffee maker 12. The unit 10 will then automatically fill the reservoir of the coffee maker 12 when the switch 24 is activated.

While a particular embodiment of the present invention has been disclosed herein, it is not intended to limit the invention to such a disclosure, and changes and modifications may be incorporated and embodied within the scope of the following claims.

What is claimed is:

1. An apparatus for automatically transferring a predetermined amount of water between a water container and a coffee maker, said apparatus comprising:
    a pump having an intake orifice and an output orifice, said pump having a predetermined flow rate for water;
    an intake pipe extending between contents of said water container and the intake orifice of said pump;
    a fill line extending between the output orifice of said pump and said coffee maker; and
    control means for regulating the amount of water passing between said water container and said coffee maker, said control means comprising a timer and an initiation switch to turn it on, said timer comprising means for turning off the electric current powering said pump.

2. Apparatus in accordance with claim 1 further including a check valve provided on the water container end of said intake pipe restraining the flow of water in the direction of the water container.

3. Apparatus in accordance with claim 2 wherein said check valve is a ball check valve.

4. Apparatus in accordance with claim 1 wherein a stand is provided supporting said pump on the top of said water container.

5. Apparatus in accordance with claim 4 wherein said stand maintains said intake pipe, said pump, and said water container in proper alignment with each other.

6. Apparatus in accordance with claim 5 wherein said stand is adapted to cover said water container and protect the contents of the water container from contamination.

7. Apparatus in accordance with claim 1 wherein said coffee maker is a commercial type automatic coffee maker having a timed valve-controlled intake designed to be attached to conventional plumbing and said timer is a timer built into said commercial type automatic coffee maker.

8. In an automatic coffee-making machine of the type including a drip coffee maker having water holding and heating means and a hot-water discharge region, a receptacle for holding ground coffee beneath said discharge region to receive the hot water emerging from said water holding and heating means, and a container for receiving the fluid resulting from passage of the hot water through the ground coffee, the improvement for insuring maximum flexibility of use and the best quality of the resulting beverage, comprising:
    a bottled water supply from which to obtain water of assured purity and quality,
    electrically controlled pump means for pumping water up from the bottom region of said bottled water supply and delivering it up to said water holding and heating means at a predetermined rate of flow,
    and means responsive to an electrical initiating signal to initiate the energization of said pump means and sustain its energization the predetermined length of time necessary for the desired charge of water of said water holding and heating means at said predetermined rate of flow.

9. The system of claim 8 further including means responsive to said initiating signal for initiating a coffee brewing cycle.

* * * * *